US006374951B1

(12) United States Patent
Michelhaugh et al.

(10) Patent No.: US 6,374,951 B1
(45) Date of Patent: Apr. 23, 2002

(54) GEAR ISOLATION SHROUD FOR TRANSMISSION

(75) Inventors: Thomas A. Michelhaugh, Portage; John C. Bierlein, Shelby Township, both of MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/507,884

(22) Filed: Feb. 22, 2000

(51) Int. Cl.[7] .............................. F01M 1/00; F01M 9/06
(52) U.S. Cl. ..................... 184/13.1; 184/11.1; 184/6.12
(58) Field of Search ............................. 184/13.1, 11.1, 184/6.12, 6.5

(56) References Cited

U.S. PATENT DOCUMENTS

| 3,734,637 A | * | 5/1973 | Beck, Jr. .................... 415/12 |
|---|---|---|---|
| 4,414,861 A | * | 11/1983 | Witt ........................... 74/606 R |
| 5,050,451 A | | 9/1991 | Hussain ........................ 74/844 |
| 5,279,391 A | | 1/1994 | Ward ........................... 184/62.1 |
| 5,505,112 A | | 4/1996 | Gee .............................. 74/606 |
| 5,678,461 A | | 10/1997 | Stine ........................... 74/606 |

FOREIGN PATENT DOCUMENTS

| FR | 2757922 A | 7/1998 | ...................... 57/4 |
|---|---|---|---|
| GB | 290225 A | 9/1928 | |
| GB | 1426352 A | 2/1976 | ...................... 57/4 |
| SU | 983361 A | 12/1982 | ...................... 57/4 |

* cited by examiner

*Primary Examiner*—David Fenstermacher
(74) *Attorney, Agent, or Firm*—Kevin M. Hinman; Howard D. Gordon

(57) ABSTRACT

An improved splash-type lubrication system (100) for a change-gear transmission (102). A closely fitting gear shroud (104) is provided with upper openings (106, 108, 110) allowing the countershaft and main shaft gears to mesh and directs splashed lubricant (112) toward needle bearings (44) supporting main shaft gears (38, 40) on the main shaft (16).

8 Claims, 7 Drawing Sheets

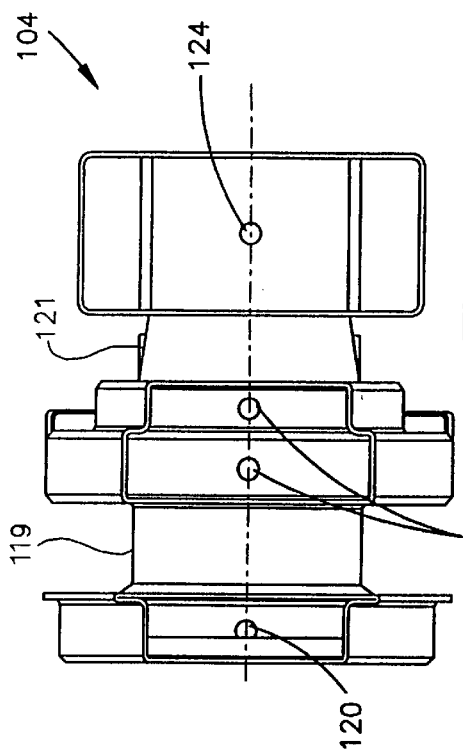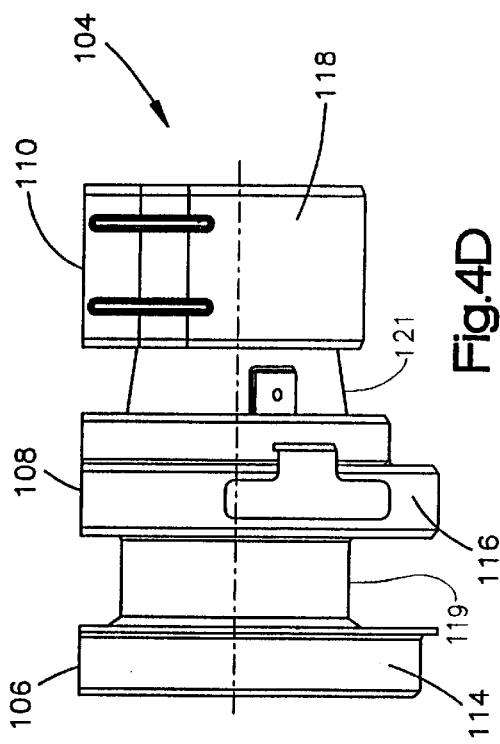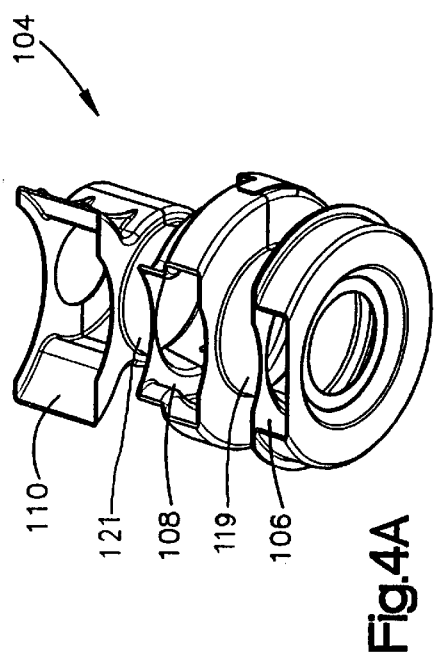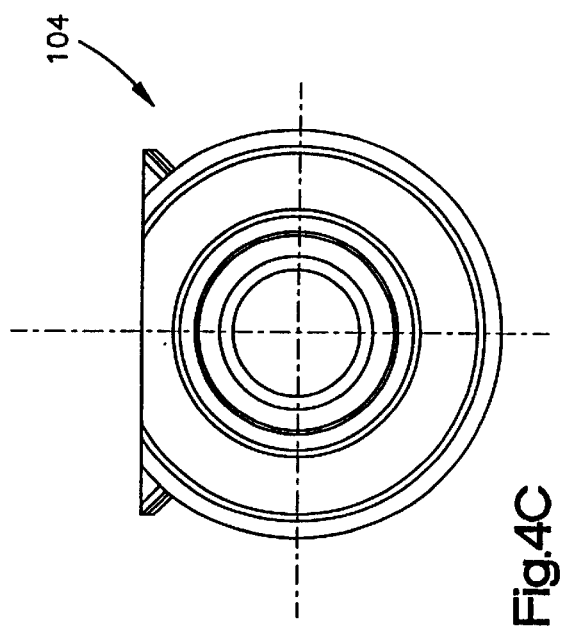

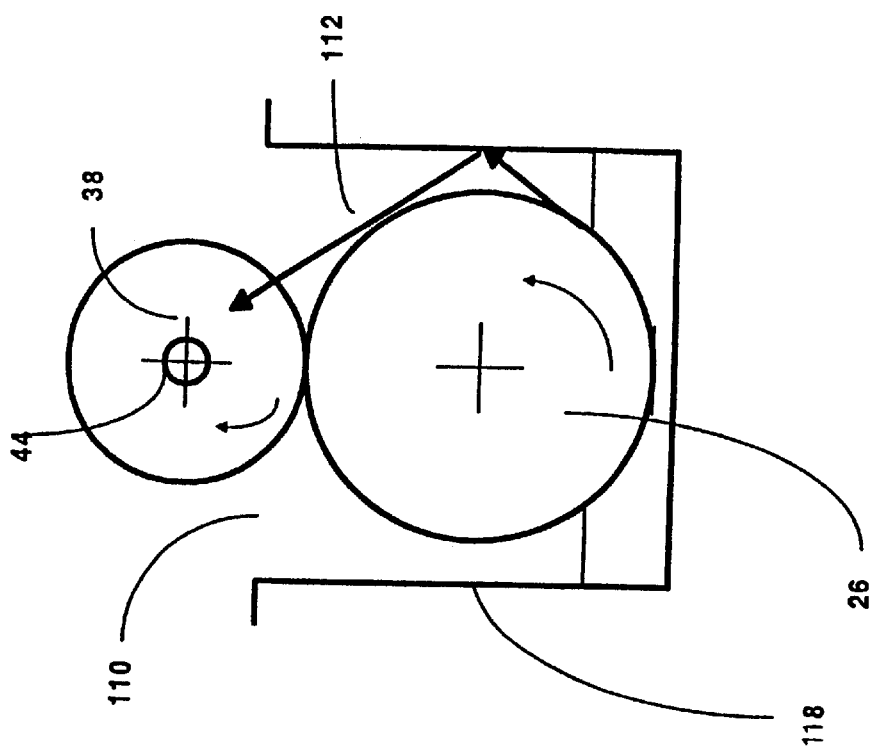
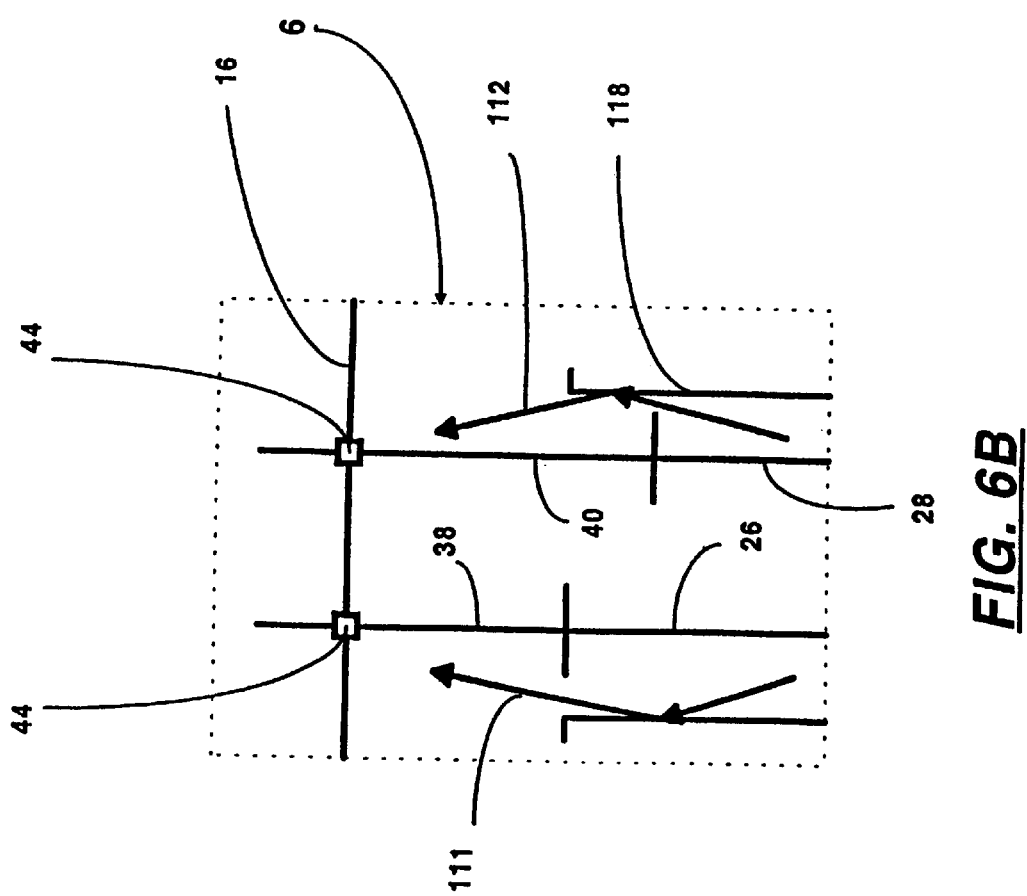
FIG. 6A
FIG. 6B

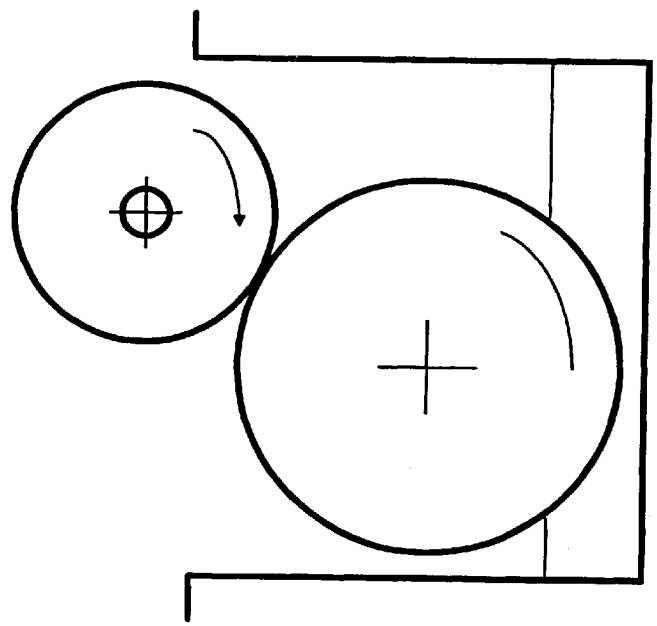
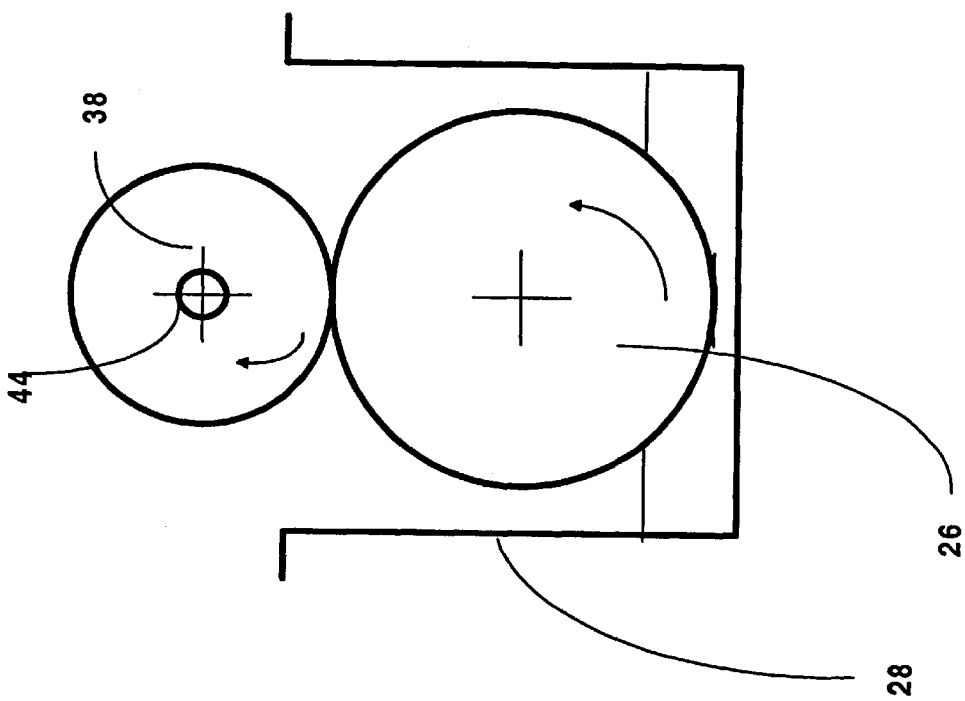
FIG. 7B
FIG. 7A

GEAR ISOLATION SHROUD FOR TRANSMISSION

BACKGROUND OF THE INVENTION

1. Field of the Invention

The present invention relates to splash-type lubrication systems for change-gear transmissions and, in particular, to an improved shroud structure for such transmissions which will reduce churning losses and assure proper lubrication of bearings on the main shaft.

2. Description of the Prior Art

Splash-type lubrication systems for vehicular change-gear transmissions are well known in the prior art. Briefly, a lubricant sump in the lower portion of the transmission housing is filled with lubricant, and the action of the transmission gears rotating through the sump will sling, splash, drip and/or otherwise direct lubricant to gear meshes and/or bearings. So-called splash-type lubrication systems, while providing somewhat inelegant but effective lubrication, are not totally satisfactory, as a relatively deep sump is required to assure that each gear will rotate therein, resulting in relatively high churning losses and heat generation.

Prior art attempts to minimize churning losses and heat generation have included pressurized systems with a "dry sump" and relatively shallow troughs used to minimize the level of lubricant in which each gear layer will rotate. Examples of such prior art solutions may be seen by reference to U.S. Pats. No. 5,505,112; 5,050,451; 5,279,391 and 4,356,889, the disclosures of which are incorporated herein by reference. These solutions were not totally satisfactory for certain applications, as they tended to be somewhat complicated, expensive and/or did not assure that a significant amount of lubricant would be directed to bearings on the main shaft.

SUMMARY OF THE INVENTION

In accordance with the present invention, the drawbacks of the prior art are minimized or overcome by the provision of a relatively simple and inexpensive splash-type lubrication system for transmissions which will assure an adequate supply of lubricant to the drive gears and the bearings supporting drive gears on the transmission main shaft/output shaft. The above is accomplished by providing a relatively close-fitting gear isolation shroud around almost the entirety of the forwardmost countershaft gears, the upper opening of the shrouds allowing the countershaft gears to mesh with input and/or main shaft gears and acting as a director to direct splashed and flung lubricant toward the drive gears and the bearings supporting gears on the main shaft. The shroud will define troughs through which the countershaft gears rotate and in which only a reduced level of lubricant is maintained to reduce churning losses.

Accordingly, it is an object of the present invention to provide a relatively simple and inexpensive splash lubrication system that will assure an adequate supply of lubricant to the bearings and gears carried by the main shaft and will reduce churning losses of the transmission.

This and other objects and advantages of the present invention will become apparent from a reading of the following description of the preferred embodiment taken in connection with the attached drawings.

BRIEF DESCRIPTION OF THE DRAWINGS

FIGS. 4A, 4B, 4C and 4D are perspective top, front and side views, respectively, of the shroud.

FIG. 6A illustrates lubricant being directed by the shroud.

FIG. 6B is an enlarged view of the portion enclosed by dotted line box 6 in FIG. 2.

FIGS. 7A and 7B illustrate alternate shaft arrangements.

DESCRIPTION OF THE PREFERRED EMBODIMENT

Figure 1:
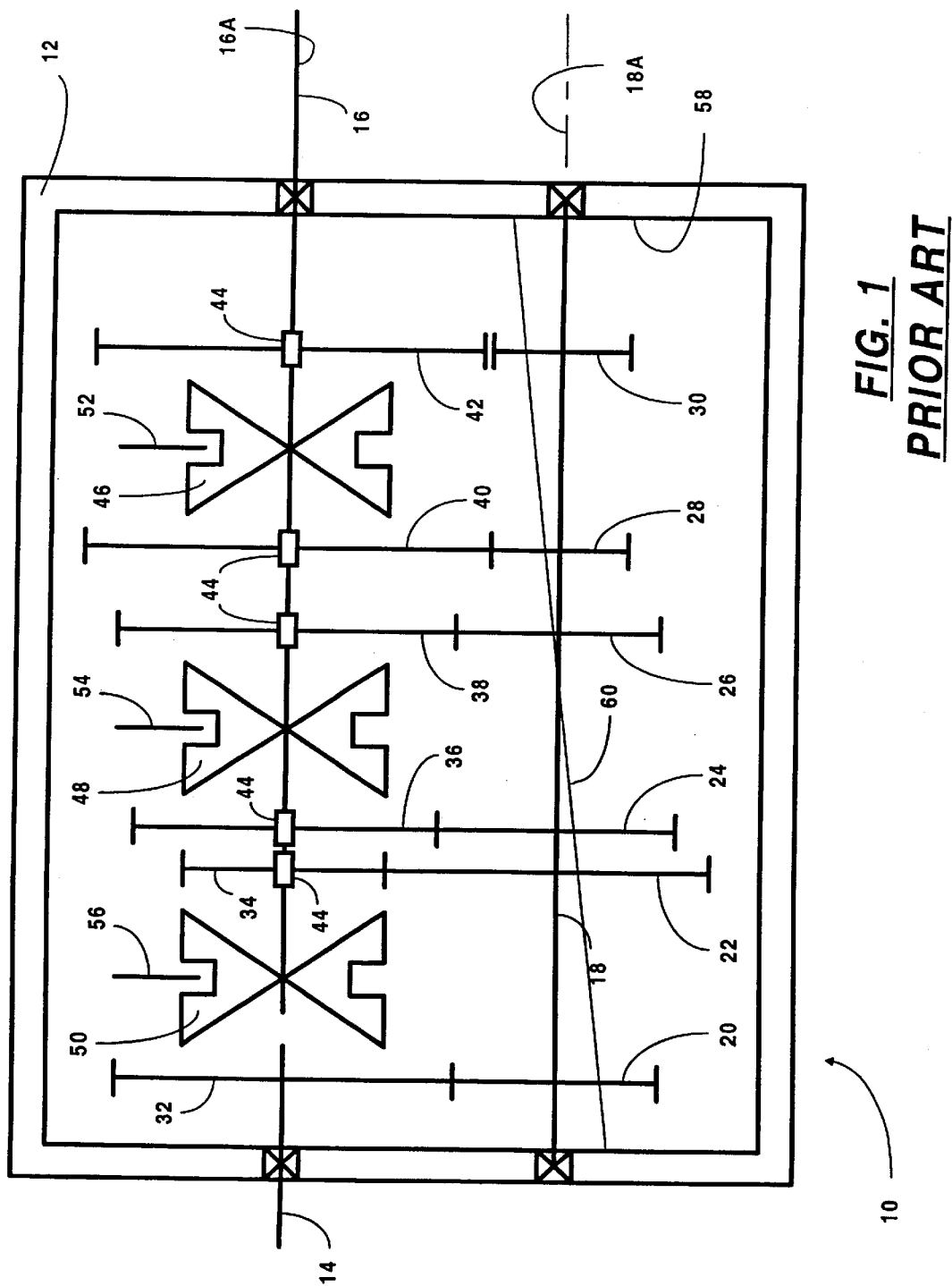
FIG. 1 is a schematic illustration of a typical 5-forward-, 1-reverse-speed transmission utilizing a standard splash-type lubrication system.
Figure 2:
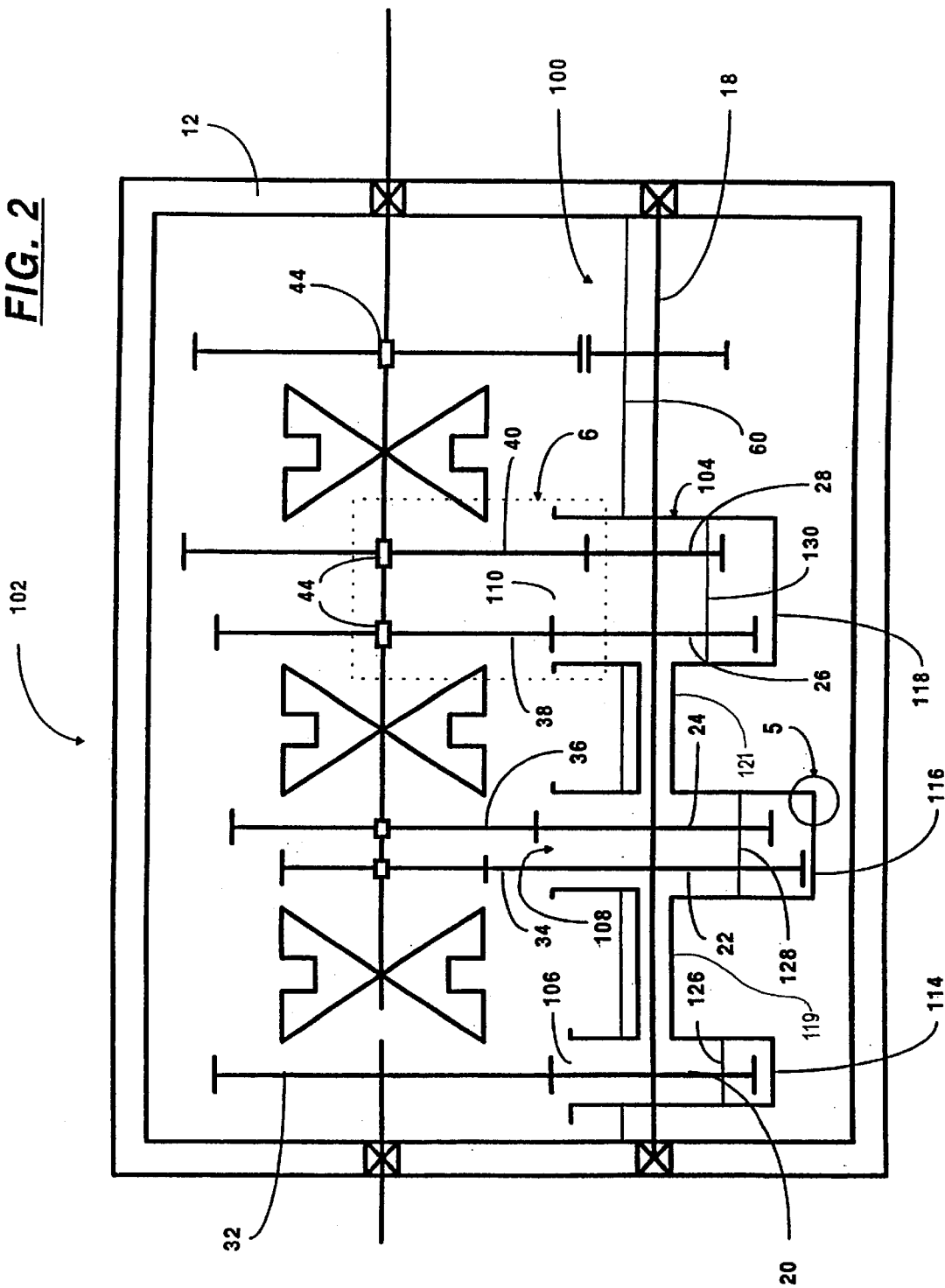
FIG. 2 is a schematic illustration, similar to FIG. 1, illustrating the splash lubrication system of the present invention.
Figure 3:
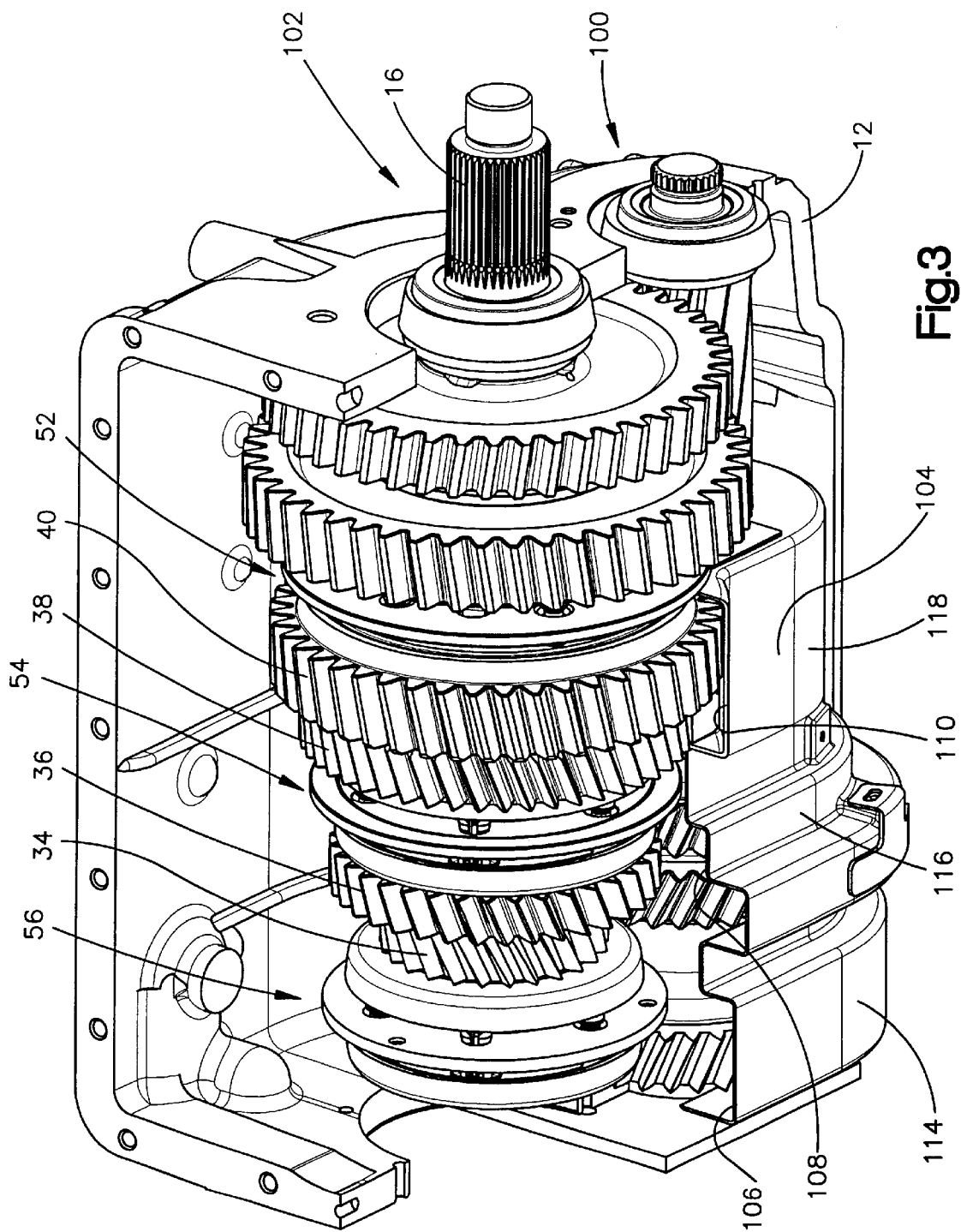
FIG. 3 is a partial plan view, partially in section, illustrating the structure of the gear isolation shroud utilized in the present invention.
Figure 5:
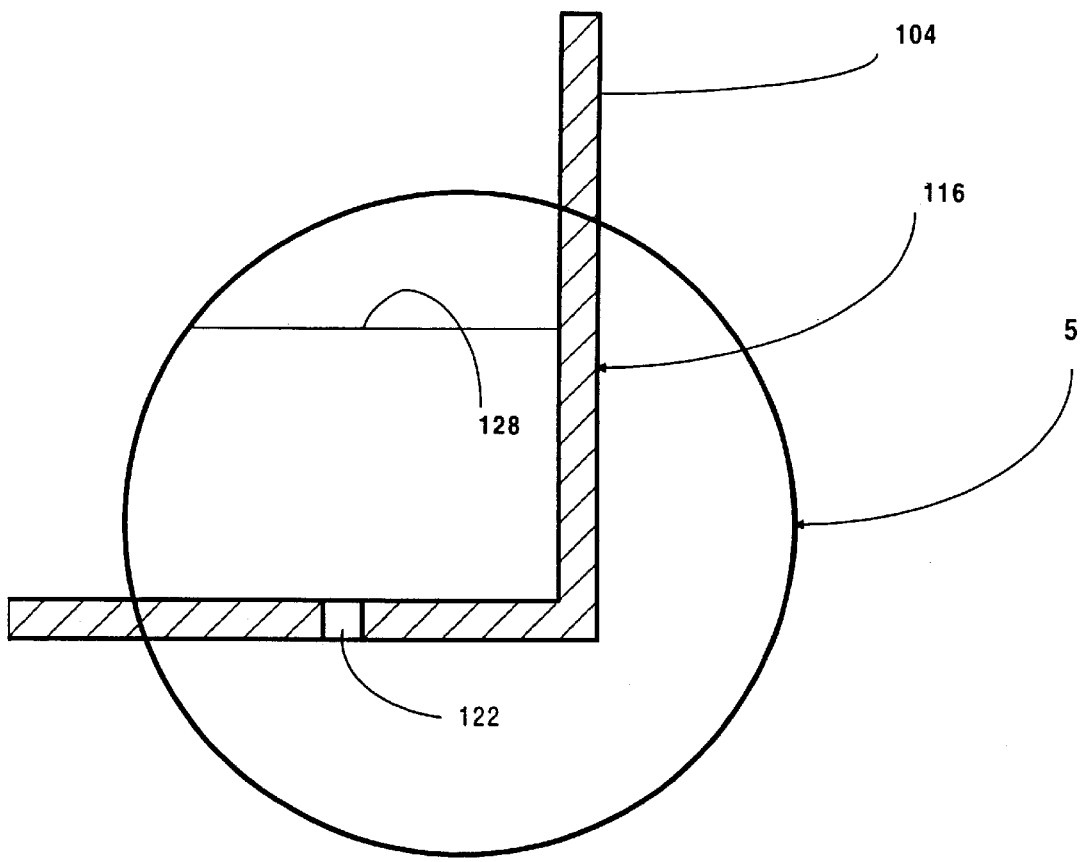
FIG. 5 is an enlarged view of the portion circled on FIG. 2 and labeled "5".

A typical 5-forward-speed, 1-reverse-speed, synchronized transmission 10 is illustrated in FIG. 1. Although figures illustrate 5- and 6-forward-speed simple transmissions, the present invention is applicable to other transmission configurations, such as compound transmissions utilizing splitter and/or range auxiliary sections.

Transmission 10 includes a housing 12 supporting an input shaft 14, a main shaft 16 (also called output shaft) and a countershaft 18. The axis of rotation 18A of countershaft 18 is parallel to and offset the axis of rotation 16A of main shaft 16. Countershaft 18 has countershaft gears 20, 20 22, 24, 26, 28 and 30 fixed for rotation therewith. Countershaft gear 20 is meshed with input gear 32, while countershaft gears 22, 24, 26 and 28 are meshed with gears 34, 36, 38 and 40, respectively, supported on the main shaft 16. Countershaft gear 30 is meshed with a reverse idler (not shown) meshed with gear 42 supported on the main shaft.

Gears 34, 36, 38, 40 and 42 are supported on shaft 16 for rotation relative thereto by bearings, usually needle bearings 44, which require proper lubrication.

Synchronized clutch assembly 46 may be used to engage either gear 42 or gear 40 to shaft 16 for reverse or first gear operation, respectively. Synchronized clutch assembly 48 may engage either gear 38 or gear 36 to shaft 16 for second or third gear operation, respectively. Synchronized clutch assembly 50 may be used to engage either gear 34 or gear 32/input shaft 14 to shaft 16 for forth or fifth gear operation, respectively. Shift forks 52, 54 and 56 are utilized to axially position the clutch assemblies 46, 48 and 50, respectively. As is known, reverse and/or first gear may use non-synchronized clutches. Transmissions of this general type may be appreciated by reference to U.S. Pat. No. 4,989,706.

The lower portion 58 of the interior of transmission housing 12 defines a lubricant sump which is filled to fill level 60 with an appropriate lubricant. Fill level 60 is shown (exaggerated) as it will appear with transmission mounted at a 3-to-6° downward backward incline, as is typical.

As the countershaft gears 20, 22, 24, 26, 28 and 30 turn through the lubricant, the lubricant would be splashed, dripped, flung and otherwise conveyed to the gear meshes and the bearings. If needed, various troughs, passages and the like are provided. While generally effective, the churning losses and heat buildup in these prior art systems may be greater than desired.

The lubrication system 100 of the present invention may be seen by reference to FIGS. 2–6B. Lubrication system 100 is illustrated as utilized in a transmission 102 which, except as noted, is structurally and functionally identical to transmission 10 described above. Elements of transmission 102 which are substantially identical to elements of transmission 10 are assigned like reference numbers.

As in transmission 10, the lower portion of the housing 12 in transmission 102 defines a lubricant sump 58 filled to fill level 60 (shown horizontally). As in transmission 10, assuring proper lubrication of the needle bearings 44 supporting the main shaft gears 34, 36, 38, 40 and 42 on shaft 16 is a critical consideration.

Transmission 102 includes a shroud 104 which closely surrounds the countershaft gears 20, 22, 24, 26 and 28. As may be seen from FIGS. 2, 3 and 4A–4D, the shroud 104 covers almost the entirety of the countershaft gears 20–28, except for upper openings 106, 108 and 110, allowing the gears to mesh with input gear 32 and main shaft gears 34, 36, 38 and 40, respectively. These openings are positioned considerably above the fill line 60 to prevent spillover from occurring at the righthand side of the transmission, viewed from the front, assuming a standard counterclockwise-rotating diesel engine drives input shaft 14. The height of the openings will also enhance the tendency of the lubricant splashing off the sidewalls of the shroud to be directed toward the needle bearings 44. FIGS. 6A and 6B schematically illustrate splashed lubricant (arrows 111 and 112) being directed through opening 110 toward the needle bearings 44 associated with main shaft gears 38 and 40.

Shroud 104 is preferably a multiple-piece plastic structure allowing assembly thereof to the transmission 102. Shroud 104 may be of any suitable material. As may be seen, the shroud defines a plurality of troughs 114, 116 and 118 through which gears 20, 22 and 24 and 26 and 28, respectively, rotate. Each of the respective troughs has a measured aperture 120, 122 and 124 therein (see FIG. 5), which is sized to allow fluid flow such that, with the countershafts rotating at a relatively high speed, the sump level 126, 128 and 130 in troughs 114, 116 and 118, respectively, is maintained at a relatively low level sufficient to cover the lower portion of the countershaft gear or gears rotating in the sump. Alternatively, the troughs may have multiple measured apertures providing an appropriate total flow therethrough The flow of lubricant through the apertures is generally equal to the expected flow of lubricant out of the troughs due to splashing, flinging, etc. While the troughs may fill to a higher level when the input shaft is not turning, this will quickly correct as the input shaft 14 begins to rotate, as the higher level of lubricant in the troughs will result in a greater outward flow of lubricant.

Accordingly, by utilizing the gear shroud 104 as indicated, proper lubrication, including lubrication of the main shaft gear needle bearings 44 and gears 32–40, is assured, while churning losses are reduced.

As may be seen by reference to FIGS. 7A and 7B, the invention is applicable to transmissions wherein the main shaft and countershaft axes are either vertical or offset.

Although the present invention has been described with a certain degree of particularity, it is understood that the description of the preferred embodiment is by way of example only and that numerous changes to form and detail are possible without departing from the spirit and scope of the invention as hereinafter claimed.

We claim:

1. A lubrication system (100) for a change-gear transmission (102) comprising:
    a housing (12),
    a main shaft (16) rotationally supported in said housing,
    a first main shaft gear (one of 34, 36, 38, 40) supported on the main shaft,
    a second main shaft gear (an other of 34, 36, 38, 40) supported on the main shaft and axially spaced from the first main shaft gear,
    a countershaft (18) rotatably supported in said housing, said countershaft having an axis of rotation (18A) parallel to and below the axis of rotation (16A) of said main shaft,
    a first countershaft gear (one of 22, 24, 26, 28) fixed to said countershaft for rotation therewith and meshed with the first main shaft gear supported on said main shaft by a bearing (44) for rotation relative thereto,
    a second countershaft gear (an other of 22, 24, 26, 28) fixed to said countershaft for rotation therewith and meshed with the second main shaft gear supported on said main shaft by a bearing (44) for rotation relative thereto,
    a lower portion of said housing defining a lubricant sump (58) filled to a sump fill level (60) such that said countershaft gear includes a portion located below said sump fill level,
    a shroud including:
        a first trough (one of 114, 116,118) mounted inside said housing and surrounding said first countershaft gear in which said first countershaft gear rotates, said first trough extending upwardly to define a first upward opening (corresponding one of 106, 108, 110) allowing said first countershaft gear to mesh with said first main shaft gear, said first upward opening located above said countershaft axis of rotation and above said sump fill level, a first fluid passage in said first trough extending from said sump to said first trough, said first passage located below the sump fill level and allowing fluid to flow from said sump into said first trough, and said first passage sized so that lubricant will flow into said trough to maintain a reservoir level (corresponding one of 126, 128, 130) in said first trough, which is below said sump fill level but above the lowest portion of said first countershaft gear as said first countershaft gear rotates at a fastest expected speed,
        a second trough (an other of 114, 116, 118) mounted inside said housing and surrounding said second countershaft gear in which said second countershaft gear rotates, said second trough extending upwardly to define a second upward opening (corresponding one of 106, 108, 110) allowing said second countershaft gear to mesh with said second main shaft gear, said second upward opening located above said countershaft axis of rotation and above said sump fill level, a second fluid passage in said second trough extending from said sump to said second trough, said second passage located below the sump fill level and allowing fluid to flow from said sump into said second trough, and said second passage sized so that lubricant will flow into said second trough to maintain a reservoir level (corresponding one of 126, 128, 130) in said second trough, which is below said sump fill level but above the lowest portion of said second countershaft gear as said second countershaft gear rotates at a fastest expected speed, and
        a connecting sleeve (one of 119 and 121) connecting facing sides of said first trough and said second trough and said sleeve enclosing the counter shaft between said first trough and said second trough.

2. The lubrication system of claim 1 wherein said troughs extend upwardly to at least halfway between said countershaft axis of rotation and a highest point defined by a major diameter of corresponding ones of said countershaft gears.

3. The lubrication system of claim 2 wherein said countershaft axis of rotation said main shaft axis of rotation define a substantially vertically extending line.

4. The lubrication system of claim 1 wherein said countershaft axis of rotation and said main shaft axis of rotation define a substantially vertically extending line.

5. The lubrication system of claim 1 wherein said bearings are needle bearings.

6. The lubrication system of claim 1 wherein one of said passages is defined by two or more apertures.

7. The lubrication system of claim 1 wherein said passages are defined by a single aperture (120, 122, 124) in each trough.

8. A lubrication system (100) for a change-gear transmission (102) comprising:
  - a housing (12),
  - a main shaft (16) rotationally supported in said housing,
  - a first main shaft gear (one of 34, 36, 38, 40) supported on the main shaft,
  - a second main shaft gear (an other of 34, 36, 38, 40) supported on the main shaft and axially spaced from the first main shaft gear,
  - a third main shaft gear (yet an other of 34, 36, 38, 40) supported on the main shaft and axially spaced from the first main shaft gear,
  - a countershaft (18) rotatably supported in said housing, said countershaft having an axis of rotation (18A) parallel to and below the axis of rotation (16A) of said main shaft,
  - a first countershaft gear (one of 22, 24, 26, 28) fixed to said countershaft for rotation therewith and meshed with the first main shaft gear supported on said main shaft by a bearing (44) for rotation relative thereto,
  - a second countershaft gear (an other of 22, 24, 26, 28) fixed to said countershaft for rotation therewith and meshed with the second main shaft gear supported on said main shaft by a bearing (44) for rotation relative thereto,
  - a third countershaft gear (yet an other of 22, 24, 26, 28) fixed to said countershaft for rotation therewith and meshed with the third main shaft gear supported on said main shaft by a bearing (44) for rotation relative thereto,
  - a lower portion of said housing defining a lubricant sump (58) filled to a sump fill level (60) such that said countershaft gear includes a portion located below said sump fill level,
  - a shroud including:
  - a first trough (one of 114, 116, 118) mounted inside said housing and surrounding said first countershaft gear in which said first countershaft gear rotates, said first trough extending upwardly to define a first upward opening (corresponding one of 106, 108, 110) allowing said first countershaft gear to mesh with said first main shaft gear, said first upward opening located above said countershaft axis of rotation and above said sump fill level, a first fluid passage in said first trough extending from said sump to said first trough, said first passage located below the sump fill level and allowing fluid to flow from said sump into said first trough, and said first passage sized so that lubricant will flow into said trough to maintain a reservoir level (corresponding one of 126, 128, 130) in said first trough, which is below said sump fill level but above the lowest portion of said first countershaft gear as said first countershaft gear rotates at a fastest expected speed,
  - a second trough (an other of 114, 116, 118) mounted inside said housing and surrounding said second countershaft gear in which said second countershaft gear rotates, said second trough extending upwardly to define a second upward opening (corresponding one of 106, 108, 110) allowing said second countershaft gear to mesh with said second main shaft gear, said second upward opening located above said countershaft axis of rotation and above said sump fill level, a second fluid passage in said second trough extending from said sump to said second trough, said second passage located below the sump fill level and allowing fluid to flow from said sump into said second trough, and said second passage sized so that lubricant will flow into said second trough to maintain a reservoir level (corresponding one of 126, 128, 130) in said second trough, which is below said sump fill level but above the lowest portion of said second countershaft gear as said second countershaft gear rotates at a fastest expected speed, and
  - a third trough (yet another of 114, 116, 118) mounted inside said housing and surrounding said third countershaft gear in which said third countershaft gear rotates, said third trough extending upwardly to define a third upward opening (corresponding one of 106, 108, 110) allowing said third countershaft gear to mesh with said third main shaft gear, said third upward opening located above said countershaft axis of rotation and above said sump fill level, a third fluid passage in said third trough extending from said sump to said third trough, said third passage located below the sump fill level and allowing fluid to flow from said sump into said third trough, and said third passage sized so that lubricant will flow into said third trough to maintain a reservoir level (corresponding one of 126, 128, 130) in said third trough, which is below said sump fill level but above the lowest portion of said third countershaft gear as said third countershaft gear rotates at a fastest expected speed,
  - a first connecting sleeve (one of 119 and 121) connecting facing sides of said first trough and said second trough and said first connecting sleeve enclosing the counter shaft between said first trough and said second trough, and
  - a second connecting sleeve (an other of 119 and 121) connecting facing sides of said second trough and said third trough and said second connecting sleeve enclosing the counter shaft between said second trough and said third trough.

* * * * *